United States Patent

Christ

[15] 3,697,807
[45] Oct. 10, 1972

[54] BIPOLAR CIRCUIT DEVICE

[72] Inventor: Klaus H. Christ, Stuttgart-Durrlewang, Germany

[73] Assignee: Robert Bosch GmbH, Stuttgart, Germany

[22] Filed: Dec. 19, 1969

[21] Appl. No.: 886,624

[30] Foreign Application Priority Data

Jan. 10, 1969 Germany..........P 19 01 075.4

[52] U.S. Cl....................317/16, 307/252 D, 317/31, 317/33 R
[51] Int. Cl.................................................H02h 3/20
[58] Field of Search.........317/16, 33, 31; 307/252 D, 307/324

[56] References Cited

UNITED STATES PATENTS

| 3,246,206 | 4/1966 | Chowdhuri | 307/324 X |
| 3,383,563 | 5/1968 | Wright | 317/16 X |
| 3,384,844 | 5/1968 | Meacham | 307/324 X |
| 3,402,325 | 9/1968 | Minks | 317/31 X |

*Primary Examiner*—James D. Trammell
*Attorney*—Michael S. Striker

[57] ABSTRACT

A protective arrangement in which a bipolar circuit device is connected across the terminals of a voltage source with voltage monitored through a voltage regulator connected to the source. The bipolar device contains two transistors of opposite conductivity type interconnected so as to exhibit low internal resistance when the output voltage from the source lies within predetermined operating limits. When the output voltage from the source exceeds a predetermined limit, due to failure of the voltage regulator, for example, the internal resistance of the bipolar device drops sharply and substantially short-circuits the terminals of the generator. The change in resistance is made permanent through destruction of the transistors as a result of heat dissipation.

12 Claims, 3 Drawing Figures

PATENTED OCT 10 1972  3,697,807

INVENTOR:
Klaus CHRIST

By
his ATTORNEY

BIPOLAR CIRCUIT DEVICE

BACKGROUND OF THE INVENTION

The present invention resides in a bipolar electrical circuit element which has characteristics dependent upon the behavior of the external circuit connected to the bipolar device. In particular, the bipolar device varies its resistance when, for example, the voltage which may be regulated, increases above a maximum limit.

For the protection of current circuits from overload due to excess voltages or currents, safety devices are known in the art which protect the circuit through opening of the circuit and thereby protect load which is supplied with current from damage. Fuses which have elements that melt or burn out, are used, for this purpose, in the simplest case. However, circuit breakers or similar such devices have also been used for these purposes. For purposes of protecting semi-conductive voltage regulators for generators, particularly alternating current generators associated with motor vehicle batteries, such safety devices are not adaptable, as used in the conventional art.

The basic reason for the condition that the conventional devices are not adapted to such semi-conductor regulators or generators, resides in the feature that the conventional devices in the form of voltage regulators maintain the output voltages of generators to a predetermined average value. Small deviations or fluctuations from higher to lower voltage values are continuously incurred during the operation of the regulator. The latter interrupts the current flow to the excitation winding of the generator when the output voltage from the generator, which is to be regulated, exceeds an upper limit. When, on the other hand, the output voltage drops below a lower limit, the circuit to the excitation winding becomes re-established. This arrangement is commonly referred to as a two-point regulator. When the regulating arrangement does not interrupt the excitation current upon an operating failure, and when the output voltage of the generator has attained its upper limit, then this voltage from the generator continues to increase in accordance with the rotational speed of the rotor. This circuit action progresses until the voltage attains excess values which are not tolerable. This dangerous situation prevails in all regulators which use a controllable semi-conductor for the purpose of controlling the excitation current. Such a semiconductor may be in the form of a transistor, and for this reason, it is essential to always take into account the possible defective operation of a semi-conductor. When the emitter-collector path of such semi-conductors are fused or burned out, such semi-conductors are always in the conducting state.

When the output voltage from the generator rises to a maximum value which cannot be tolerated, the danger prevails that the filaments of the lamps in the motor vehicle, for which the generator is used, become burned out. At the same time, it is also possible that the battery of the motor vehicle, used in conjunction with the generator, becomes over-charged and the battery fluid becomes vaporized. Thus, the resultant damages due to the defective operation of the voltage regulator can be considerable.

Safety arrangements which react to excess current are, in this case, not adaptable because the difference between the current magnitude for normal operation and the current magnitude which prevails when over-voltage is applied, is too small to provide a functionally reliable safety device. It is known in the art for such cases, to use over-voltage relays for switching off, for example, the excitation current for the purpose of avoiding the equipment damages described above. These mechanical arrangements, however, are very subjectable to disturbances and operating problems. At the same time, the electro-mechanical relays, for example, are often too complex, too large, and too costly. For this reason, safety arrangements have been sought which cause a short-circuit across the output voltage of the generator, and thereby cut-off the excitation current. One switching arrangement which is known in the art, uses a thyristor for this purpose, but this arrangement requires a large number of individual circuit components and consumes or occupies, therefore, a considerable amount of space.

Accordingly, it is the object of the present invention to provide an arrangement which produces a short-circuit across the output terminals of a voltage source, as soon as such voltage across the terminals exceeds a predetermined magnitude which is not tolerable. It is a specific object of the present invention to provide such an arrangement through simple means and means which is not itself subjectable to defective operation.

A simple and effective solution to the preceding objects is achieved through a circuit device which includes two bipolar transistor elements. Under normal operating conditions, the circuit device exhibits a high internal resistance, whereas the internal resistance decreases when the voltage applied across the terminals of the circuit device exceeds a predetermined value. The decrease in resistance of the device results from the heat dissipation within the device.

The desired effect may be realized in a particularly advantageous manner when the switching path of the first transistor element is in series with the control path of the second transistor element. In this advantageous design, furthermore, this series circuit is arranged between the first and second terminals of the voltage to be monitored. An element with voltage breakdown characteristics, moreover, is connected between one terminal of the voltage source and the control terminal of one of the transistor elements.

SUMMARY OF THE INVENTION

A bipolar circuit device in which two transistors are interconnected to form a circuit which exhibits high internal resistance under normal operation of a voltage source. The bipolar circuit device is connected across the terminals of the voltage source which may be in the form of an alternating current generator to which rectifiers are connected for the purpose of rectifying the alternating output voltage from the generator. The generator itself may be used for purposes of generating power for the lighting of lamps and the charging of a battery in a motor vehicle. A voltage regulator may also be connected to the output of the generator. When, for any reason, such as defective operation of the voltage regulator, the output voltage of the generator exceeds a predetermined limit, the internal resistance of the bipolar circuit device decreases sharply, and substantially short-circuits the terminals of the voltage source. The resistance decrease of the bipolar circuit device is made permanent through the heating effect of the transistors, so that the transistors become fused or alloyed and are rendered, thereby, permanently conducting. Once such short-circuit across the terminals of the generator prevails, current is no longer fed to the excitation winding of the generator, so that the generator becomes automatically unexcited.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
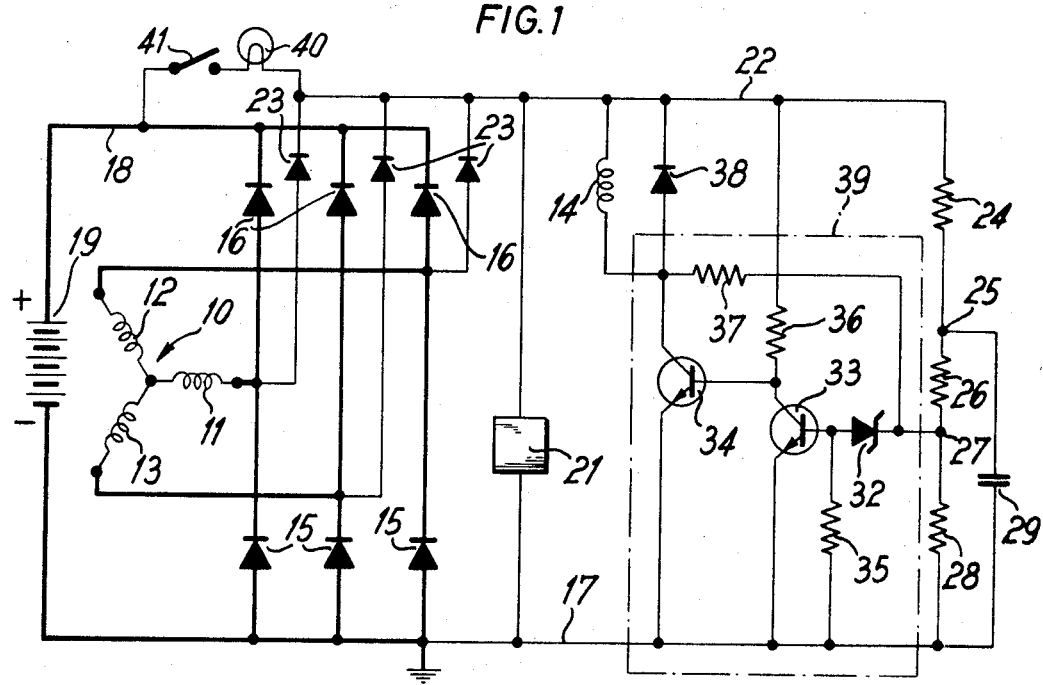
FIG. 1 is an electrical circuit diagram of a voltage source with voltage regulator for regulating the output voltage of the source, and a bipolar electrical device for protecting the output circuitry and the generator itself in the event of defective operation, in accordance with the present invention.

Referring to the drawing, an alternating current machine used for lighting purposes is generally denoted by the reference numeral 10, and has three windings 11, 12 and 13. The alternating current generator has also an excitation winding 14 which is moved relative to the alternating current windings 11, 12 and 13, in the conventional manner, so that three alternating voltages are generated 120° out of phase with each other.

The alternating current windings 11 to 13 are connected, through three rectifiers 15, to a common negative or ground supply line 17. At the same time, these alternating current windings 11 to 13, are connected to the positive supply line 18, through three rectifiers 16. The rectifiers 15 and 16 are interconnected to form a three-phase rectifying bridge. A storage battery 19 is connected between the lines 17 and 18.

A second positive supply line 22 is simultaneously connected to the alternating current windings 11 to 13, through three additional rectifiers 23. These rectifiers 23 form, together with the rectifiers 15, a second rectifying bridge so that the voltage prevailing between the supply lines 18 and 17 is substantially identical to the voltage prevailing between the supply lines 22 and 17.

A bipolar electrical circuit device 21, in accordance with the present invention, is connected between the supply lines 22 and 17.

One terminal of a resistor 24 is connected to the supply line 22, whereas the other terminal of the resistor is connected to a circuit junction 25, to which a resistor 26 is also connected. This resistor 26 is, furthermore, connected to a resistor 28 through the circuit junction 27, and one terminal of the resistor 28 is connected to the supply line 17 or ground potential.

The arrangement is such that the resistors 24, 26 and 28 form together a voltage divider which is connected to the output voltage of the generator 10, which is to be regulated for lighting purposes. A smoothing capacitor 29 is connected between the junction 25 and ground potential for the supply line 17. It is the function of this capacitor 29 to smooth out or compensate for brief voltage fluctuations between the supply line 17 and 22.

The cathode of a zener diode 32, which serves as a non-linear element, is connected to the junction 27. The anode of the zener diode 32, on the other hand, is connected to the base of a control transistor 33 which is of the npn type. The emitter of this transistor 33, as well as an emitter of a second npn transistor 34, are connected together and directly to ground potential. A resistor 35 is connected between the base of the transistor 33 and ground potential.

The collector of the transistor 33 is, on the one hand, connected directly with the base of the transistor 34. At the same time, this collector of the transistor 33 leads to the supply line 22, through a resistor 36. The collector of the transistor 34 is connected to one terminal of the excitation winding 14, and also to a resistor 37 leading to the junction 27. The other terminal of the excitation winding 14 is connected to the supply line 22. A diode 38 is connected in parallel with the excitation winding 14 and with its cathode to the supply line 22.

The components 32 to 37 contain within the dash-dot border 39, form an amplifier which consists only of resistors and transistors. For this reason, this amplifier may be readily realized through microelectronics integrated circuitry.

A charge indicating lamp 40 and an ignition switch 41 are connected in series, and this series combination is connected, in turn, across the supply lines 22 and 18.

In operation of the circuit, assume, for example, that the generator 10 delivers a voltage which is too small, so that the potential at the junction 27 is so low that the zener diode 32 is cut-off. The transistor 33 thereby does not acquire any base current, and is therefore turned off. The collector of this transistor 33 has then a positive potential relative to the supply line 17, and accordingly base current flows int the transistor 34 and renders this transistor conducting. As a result, current flows through the excitation winding 14 and the output voltage of the generator 10 thereby increases.

The collector of the transistor 34 has, thereby, substantially the potential of the negative supply line 17, so that in this case, the resistors 37 function as if it were situated between the junction 27 and ground potential. Thus, this resistor 37 reduces the voltage across the resistor 28 of the voltage divider consisting of elements 24, 26 and 28. With the voltage across the resistor 28 reduced, in this manner, the control transistor 33 and the zener diode 32 are both turned off. When the output voltage from the generator 10 increases, the potential at the junction 27 becomes finally positive, so that the zener diode 32 conducts and base current flows in the transistor 33. With such base current in the transistor 33, the latter also commences to become conducting. As the transistor 33 conducts, its collector current increases considerably, and as a result, the base current of the transistor 34 is reduced. The collector potential of the transistor 34 becomes thereby more positive and attains substantially the potential of the supply line 22. The resistor 37 then functions as if it were situated between the junction 27 and the supply line 22. Thus, this resistor 37 increases the potential of the junction 27 by, for example, 0.2 volts. The zener diode 32 becomes conducting through this potential increase, and the transistor 34 becomes fully turned off.

The coupling through the resistor 37 makes possible a very rapid switching of the transistor 34, in which it is switched from its turned-off state to its conducting state and vice versa. Through the advantageous arrangement of the smoothing capacitor 29, the coupling through the resistor 37 is made fully effective.

After cut-off of the transistor 34, the current in the excitation winding 14 is reduced exponentially. In this case, the current flows through the diode 38. As a result, the output voltage of the generator 10 drops again from its upper limit. This reduction in the output voltage of the generator extends until the zener diode 32 becomes again cut-off. At this lower limit of the output voltage, the transistor 34 becomes again conducting, and current flows anew through the excitation winding 14. The output voltage thus increases again, and the regulating cycle begins anew. The transistor 34 switches or controls the current through the excitation winding 14, depending upon the load on the generator, so that such switching takes place between 10 and 100 times a second.

If the transistor 34 is no longer turned off, for any reason, then current flows continuously through the excitation winding 14. A possible reason for the transistor 34 being no longer turned off may reside in the condition that the current path from the junction 27 to the base 33 is, for example, interrupted through a defect in the zener diode 32. At the same time, such defective operation may result from the condition that the transistor 34 is, itself, fused or alloyed. The result of such a condition of the transistor 34 is that the output voltage of the generator 10 increases in an undesirable manner.

Figure 2:
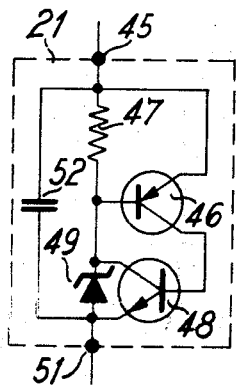
FIG. 2 is a circuit diagram of one embodiment of the bipolar circuit device used in the arrangement of FIG. 1.

The bipolar circuit device 21 is shown in structural detail in FIG. 2. Connected to the first input terminal 45 of this device 21, is the emitter of a first transistor 46 which is of the pnp type. The terminal of resistor 47, furthermore, is also connected to this emitter of the transistor 46. The other terminal of the resistor 47 is joined to the base of the transistor 46, as well as the collector of another transistor 48 which is of the npn type. At the same time, this other terminal of the resistor 47 is also connected to the cathode of a zener diode 49. The collector of the first transistor 46 is connected with the base of the second transistor 48. The anode of the zener diode 49 and the emitter of the second transistor 48 are joined both to the second terminal 51 of this bipolar circuit device 21. A bridging capacitor 52 is connected between these terminals 45 and 51 of the circuit device 21.

Figure 3:
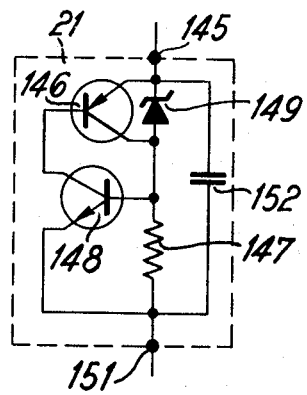
FIG. 3 is a circuit diagram of another embodiment of the bipolar circuit device used in FIG. 1, in accordance with the present invention.

A second variation of the bipolar switching device 21 is shown in FIG. 3. Connected to the first terminal 145 of this device, is the emitter of a first transistor 146 which is of the pnp type. The emitter of this transistor is also connected to the cathode of a zener diode 149. The anode of this zener diode, on the other hand, is connected to the collector of this first transistor 146. The base of the transistor 146 is joined to the collector of a second transistor 148 which is of the npn type. A resistor 147 is connected between the base of the transistor 148 and its emitter. The junction of the emitter of the transistor 148 and resistor 147, leads to the second terminal 151 of the device 21. A bridging capacitor 152 is connected across the two terminals 145 and 151 of the bipolar device 21.

The bipolar circuit device 21 is arranged in the circuit of the voltage regulators so that the first terminal 45, for the embodiment of FIG. 2, is connected to the positive supply line 22, whereas the second terminal 51 is connected to the negative supply line 17. This same situation applies to the embodiment of FIG. 3 in which the terminal 145 an 151 corresponds to the terminals 45 and 22, respectively, of FIG. 2.

When the storage battery 19 has a nominal voltage of 12 volts, the maximum charging voltage during normal operation is substantially 14.5 volts. With such voltage value, the bipolar switching device 21 exhibits a very high internal resistance, since the two transistors 46 and 48 are turned off or cut-off. When, on the other hand, this charging voltage exceeds this maximum value by a predetermined amount due, for example, to the defective operation of the voltage regulator 39, then the internal resistance of the bipolar circuit device drops to a very low value.

The reason for the preceding behavior of the bipolar circuit device resides on conditions among which is that the zener voltage of the zener diode 49 is established so that it is substantially 2 volts above the maximum charging voltage. This zener voltage is that voltage above which the diode 49 breaks down. When, in case of trouble or defective operation, the voltage across the terminals 45 and 51 exceeds the sum of the zener voltage of the diode 49 and the base-emitter voltage of the transistor 46, the zener diode 49 breaks down and causes the transistor 46 to conduct. The significance of this condition is that the emitter-collector path of the transistor 46 exhibits a very low resistance or impedance. Accordingly, substantially all of the charging voltage lie across the emitter-base path of the second transistor 48 which also now becomes conducting. Since, however, the emitter-collector path of the second transistor 48 is of low resistance, substantially all of the charging voltage is applied also across the base-emitter path of the first transistor 46, and is independent of whether the zener diode 49 is or is not conducting. The two transistors 46 and 48 maintain themselves in the conducting state, once they have been first transferred to this conducting state. As a result, the switching path of the one transistor is connected in series with the control path of the other transistor, and the two series circuits are arranged in parallel with each other. Since the parallel arrangement of the two series circuits of the two transistor 46 and 48, is driven without a protective resistance at the charging voltage which is too high, the current flow through the series connected collector-emitter and base-emitter paths, become vary large. As a result of such large current flow, the transistor elements 46 and 48 become substantially heated. This heating effect which arises from local heating of the semi-conducting elements, cannot be sufficiently rapidly conducted away, and accordingly, the two collector-emitter paths become fused or burned out. This process is irreversible. The collector-emitter paths of the transistors 46 and 48 exhibit a very low resistance which no longer varies substantially. The emitter-base diode of the first transistor 46 and the base-emitter diode of the second transistor 48 are, in this case, in parallel and in the conducting state.

The resistor 47 serves to bias the base of the first transistor 46 relative to its emitter, during normal operation, and to maintain the resistor 46 turned of during such operation. The capacitor 52 is designed to reduce or eliminate voltage spikes which can appear across the bipolar circuit device, and which may actuate this safety device haphazardly or in an undesignated manner. All of the elements or components, 46,47,48,49 and 52 can be contained on a chip through integrated microelectronic circuitry.

When, in case of defective operation or trouble, the bipolar element 21 exhibits a very low internal resistance, the output voltage of the generator 10 is eliminated, and the current through the excitation winding 14 is reduced. Accordingly, the generator causes itself to be without excitation. The charging control lamp 40 becomes now lighted, and current flows through the lamp from the positive terminal 18 of the battery 19, and through the fused transistors and excitation winding 14, as well as the regulating arrangement to the negative supply line 17.

The preceding process cannot be reversed. In this case of defective operation, the entire regulator must be tested and additional damage cannot be subsequently caused through incorrect manipulation or manual handling of the circuit arrangement.

In accordance with the present invention, the arrangement of a bipolar circuit device across the output terminals of the generator and parallel to the inputs of the associated voltage regulator, serves as a protective device, This protective device cuts off the excitation current through simple circuit means and in a reliable manner, when the output voltage of the generator attains undesirably high values as a result of defective operation of the voltage regulator. Thus, the possible damages resulting from over-voltages in the output network, are avoided in a particularly simple manner. The present invention provides a very simple safety device which is reliable and compact and which produces a short-circuit when the prevailing voltages exceed a predetermined limit.

It will be understood that each of the elements described above, or two or more together, may also find a useful application in other types of constructions differing from the types described above.

While the invention has been illustrated and described as embodied in a bipolar circuit device, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A bipolar circuit device comprising, in combination, a source of voltage applied across two terminals of said source; two bipolar transistors interconnected across said two terminals and having a substantially high internal resistance when said voltage lies within predetermined operating limits, the internal resistance of said bipolar transistors being substantially decreased permanently when said voltage exceeds a predetermined limit, and wherein the interconnection between said two bipolar transistors does not include an external connection between the bases of said two bipolar transistors, the switching path of a first one of said transistors being connected in series with the control path of the second one of said transistors, the series combination of said switching path and said control path being connected across said two terminals of said source; and means with voltage breakdown characteristics connected between one of said terminals of said source and the control terminal of one of said transistors.

2. The bipolar circuit device as defined in claim 1 wherein the switching path of a first one of said transistors is connected in series with the control path of the second one of said transistors, the series combination of said switching path and said control path being connected across said two terminals of said source.

3. The bipolar circuit device as defined in claim 1 wherein the base of the first one of said transistors is connected to the collector of the second one of said transistors, the base of said second transistor being connected to the collector of said first transistor.

4. The bipolar circuit device as defined in claim 2 wherein said first transistor is of the pnp type with emitter connected to the first one of said terminals of said source, said second transistor being of the pnp type with emitter connected to the second one of said terminals of said source.

5. The bipolar circuit device as defined in claim 1 wherein said means with voltage breakdown characteristics comprises a zener diode.

6. The bipolar circuit device as defined in claim 5 wherein the anode of said zener diode is connected to the emitter of one of said transistors, the cathode of said zener diode being connected to the collector of said one of said transistors.

7. The bipolar circuit device as defined in claim 6 including a resistor connected between the base and emitter of the other one of said transistors.

8. The bipolar circuit device as defined in claim 5 wherein the cathode of said zener diode is connected to the emitter of one of said transistors, the anode of said zener diode being connected to the collector of said one of said transistors.

9. The bipolar circuit device as defined in claim 8 including resistor means connected between the base and the emitter of said one of said transistors.

10. The bipolar circuit device as defined in claim 1 including voltage regulating means connected to said terminals of said source for regulating said source, said source being a generator with excitation winding.

11. The bipolar circuit device as defined in claim 10 wherein said generator is an alternating current generator.

12. The bipolar circuit device as defined in claim 1 wherein said internal resistance is decreased permanently through heat dissipation when said voltage exceeds said predetermined limit.

* * * * *